US009674789B1

(12) United States Patent
Govindswamy et al.

(10) Patent No.: US 9,674,789 B1
(45) Date of Patent: Jun. 6, 2017

(54) METHOD AND APPARATUS FOR UPLINK POWER ADJUSTMENT

(71) Applicant: MBIT WIRELESS, INC., Irvine, CA (US)

(72) Inventors: Arumugam Govindswamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/132,515

(22) Filed: Apr. 19, 2016

(51) Int. Cl.
*H04B 7/00* (2006.01)
*H04W 52/04* (2009.01)
*H04W 52/14* (2009.01)

(52) U.S. Cl.
CPC ......... *H04W 52/04* (2013.01); *H04W 52/146* (2013.01)

(58) Field of Classification Search
CPC . H04W 52/146; H04W 52/48; H04W 52/242; H04W 72/042; H04W 72/04; H04W 72/0413; H04W 52/325; H04W 24/10; H04W 52/10; H04W 52/246; H04W 52/44; H04W 52/18; H04W 72/1284; H04W 52/04

USPC ........ 455/522, 69, 68, 67.11, 450, 509, 445, 455/500, 517, 127.1–127.3, 550.1, 422.1, 455/403, 426.1, 426.2, 414.1–414.4; 370/329, 328, 252, 318, 335, 310
See application file for complete search history.

(56) References Cited

U.S. PATENT DOCUMENTS

2012/0207107 A1* 8/2012 Li .................... H04W 52/58
370/329

* cited by examiner

*Primary Examiner* — Keith Ferguson
(74) *Attorney, Agent, or Firm* — Lerner, David, Littenberg, Krumholz & Mentlik, LLP (57) ABSTRACT

Uplink power control is an essential part of wireless communication systems. The transmit power control operation in the uplink of a wireless communication system is a combination of the algorithms used at the base station and the reception and processing of the power control commands at the client terminal. An important aspect for the effectiveness of transmit power control is the timeliness of the changes made to the uplink transmit power at the client terminal. Sometimes the transmit power control loop may take longer time to respond to real time dynamics and may lead to inferior performance. A method and apparatus are disclosed that enable the power control adjustments at the client terminal such that the uplink transmit power is within the specified limits of the wireless communication network and yet enhance the performance of the client terminal and the wireless communications network.

20 Claims, 7 Drawing Sheets

FIG. 2

(Prior Art)

METHOD AND APPARATUS FOR UPLINK POWER ADJUSTMENT

BACKGROUND

Figure 1:
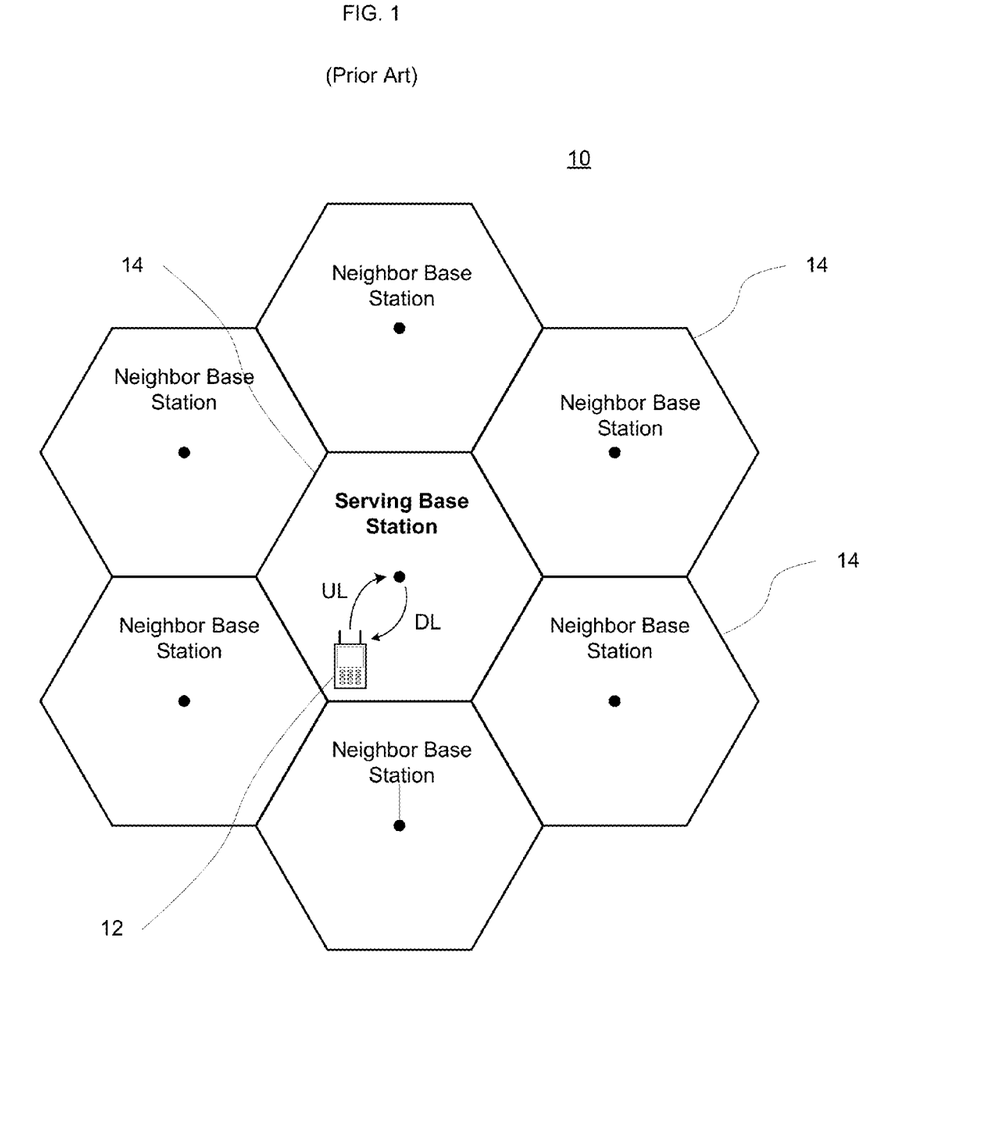
FIG. 1 illustrates a conventional mobile wireless communication system.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred to as the serving base station. In some wireless communication systems the serving base station is normally referred to as the serving cell. The terms base station and a cell may be used interchangeably herein. In general, the cells that are in the vicinity of the serving cell are called neighbor cells. Similarly, in some wireless communication systems a neighbor base station is normally referred to as a neighbor cell.

Figure 2:
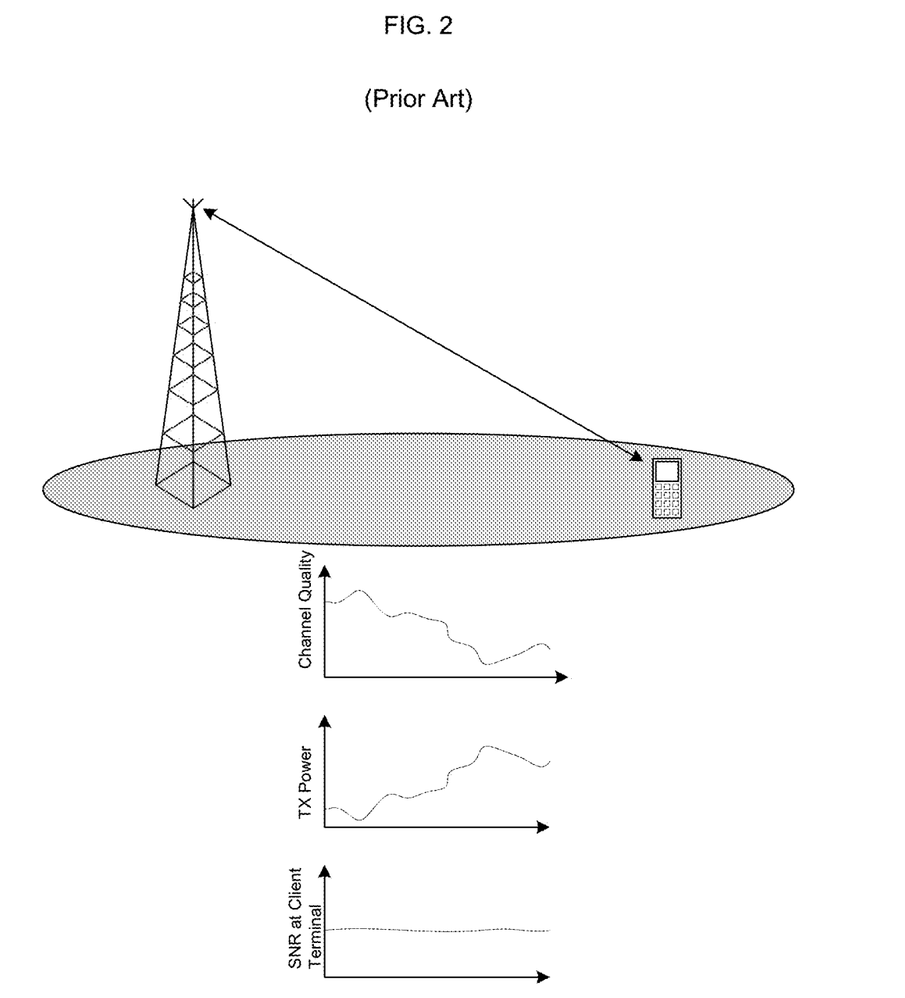
FIG. 2 illustrates an example uplink transmit power control operation.

Uplink transmit power control may dynamically change the transmit power to compensate for variations in the instantaneous channel conditions and path loss as a function of the distance between the client terminal and base station. As shown in FIG. 2, the aim of these changes may be to maintain a near constant Signal-to-Noise Ratio (SNR) at the receiver to successfully transmit data without the error probability becoming too high. Under normal conditions, uplink transmit power control increases the power at the transmitter when the radio link experiences poor radio conditions and vice versa.

Figure 3:
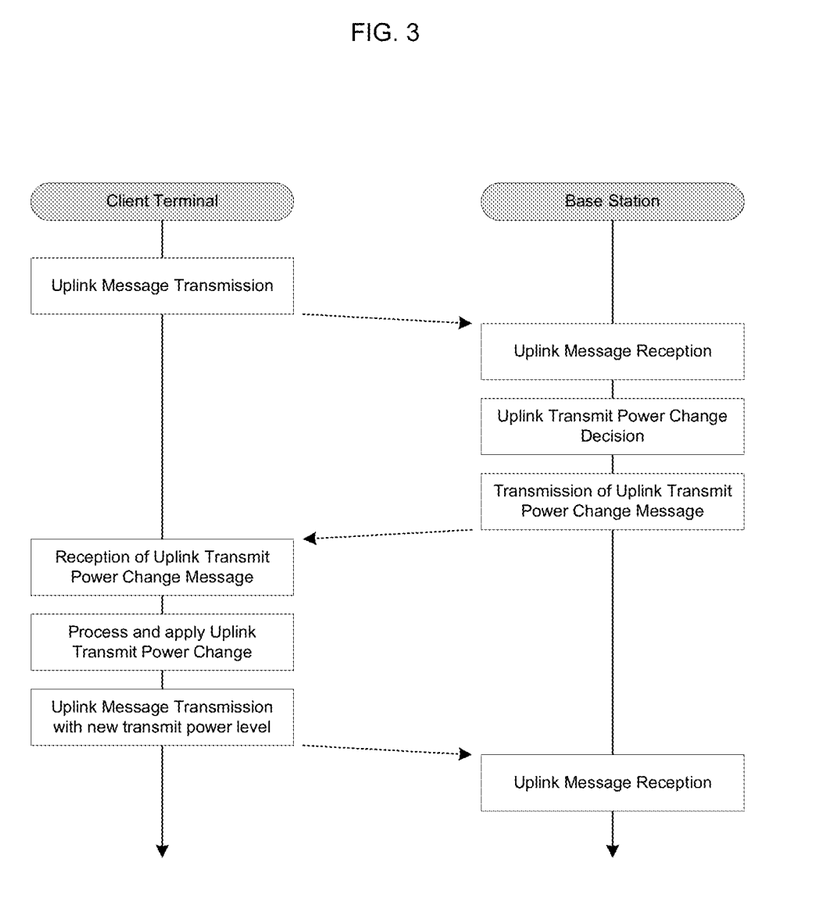
FIG. 3 illustrates processing steps involved in normal uplink transmit power control operation.

The uplink transmit power control may be based on a sequence of steps as described below and illustrated in FIG. 3.

1. The signal transmitted by the client terminal is processed at the receiver in the base station. Based on processing of the received signal, the base station may determine whether a change to the uplink transmit power level is necessary.
2. If uplink transmit power level change is necessary at the client terminal, the base station may prepare and schedule an uplink transmit power control message to the client terminal.
3. The uplink transmit power control message may be transmitted from the base station to the client terminal in the downlink.
4. The client terminal may receive and process the uplink transmit power control message.
5. The client terminal may use the received uplink transmit power control message to make change to uplink transmit power level for any future transmissions in the uplink.

The above process may be repeated on a continual basis to ensure that the client terminal is operating at the optimum uplink transmit power level.

Generally there may be delays involved in the transmission, reception, and processing at both the client terminal and the base station. These delays lead to a certain lag in reacting to the actual propagation channel conditions which may vary fast. For example, the delays for the overall power control loop could be in the order of few tens of milliseconds. Furthermore, in some cases the uplink transmit power control may be an open loop, i.e., there may not be any power control feedback from the base station. For example, such situations may arise during initial transmissions such as Random Access for connection setup from a client terminal. There may be other scenarios where the client terminal may have to transmit in uplink without receiving an uplink transmit power control message after each uplink transmission. The uplink transmit power level may not be optimal in such scenarios.

SUMMARY

A method and apparatus are disclosed that enable the client terminal to perform uplink transmit power control even when there is delay or there is no uplink power control message from the base station while meeting the requirements of the wireless communication network.

In accordance with an aspect of the disclosure, a method may adjust uplink power at a client device in a wireless communication network. The method may include controlling, by a processing device, monitoring whether a negative acknowledgement (NACK) is received at the client device; and when a NACK is determined to be received, setting an accumulated increase $\Delta_1$ equal to a sum of $\Delta_1$ and a power $\delta_1$, when the accumulated increase $\Delta_1$ is greater than an increase threshold $\alpha_1$, setting $\Delta_1$ equal to $\alpha_1$, and determining an uplink transmit power level to be used for transmission $P_{TX\_A}$, wherein $P_{TX\_A} = P_{TX\_C} + \Delta_1$ and wherein $P_{TX\_C}$ is equal to a current uplink transmit power level commanded by the network, wherein the uplink transmit power level to be used for transmission $P_{TX\_A}$ is determined independent of receipt of an uplink power control message from the network at the client device.

In accordance with an aspect of the disclosure, a method may adjust uplink power at client device in a wireless communication network. The method may include controlling, by a processing device, monitoring a number of positive acknowledgements (ACK) continuously received at the client device; and when the number of ACKs continuously received is determined to exceed a threshold $ACK_{TH}$, setting an accumulated decrease $\Delta_1$ equal to a power $\delta_1$ subtracted from $\Delta_1$, when the accumulated decrease $\Delta_1$ is less than a decrease threshold $\alpha_1$, setting $\Delta_1$ equal to $\alpha_1$, and determining an uplink transmit power level to be used for transmission $P_{TX\_A}$, wherein $P_{TX\_A} = P_{TX\_C} + \Delta_1$ and wherein $P_{TX\_C}$ is equal to a current uplink transmit power level commanded by the network, wherein the uplink transmit power level to be used for transmission $P_{TX\_A}$ is determined independent of receipt of an uplink power control message from the network at the client device.

In accordance with an aspect of the disclosure, a method may adjust uplink power at a client device in a wireless communication network. The method may include controlling, by a processing device, monitoring whether a positive acknowledgement (ACK) or negative acknowledgement (NACK) is received at the client device, (A) when a given NACK is determined to be received and a number of NACKs continuously received $N_{NACK}$ is determined to exceed a threshold $NACK_{TH}$, setting an accumulated increase $\Delta_1$ equal to a sum of $\Delta_1$ and a power $\delta_1$, $N_{NACK}$ equal to zero, and an accumulated decrease $\Delta_2$ equal to zero, and when the accumulated increase $\Delta_1$ is greater than an increase threshold $\alpha_1$, setting $\Delta_1$ equal to $\alpha_1$; (B) when a given ACK is determined to be received and a number of ACKs continuously received $N_{ACK}$ is determined to exceed a threshold $ACK_{TH}$, setting the accumulated decrease $\Delta_2$ equal to a power $\delta_2$ subtracted from $\Delta_2$, $N_{ACK}$ equal to zero, and the accumulated increase $\Delta_1$ equal to zero, and when the accumulated decrease $\Delta_2$ is less than a decrease threshold $\alpha_2$, setting $\Delta_2$ equal to $\alpha_2$; and (C) when the given ACK or the given NACK is determined to be received, determining an actual uplink transmit power level to be used for transmission $P_{TX\_A}$, wherein $P_{TX\_A}=P_{TX\_C}+\Delta_1+\Delta_2$ and wherein $P_{TX\_C}$ is equal to a current uplink transmit power level commanded by the network, wherein the actual uplink transmit power level to be used for transmission $P_{TX\_A}$ is determined independent of receipt of an uplink power control message from the network at the client device.

In one alternative, the method may include controlling, by the processing device, when a given uplink power control message is not received from the network at the client device before an initial transmission of new data by the client device, setting an uplink transmit power level to be used for the initial transmission of the new data to an uplink transmit power level corresponding to a last successful uplink transmission by the client device.

In one alternative, the method may include controlling, by the processing device, when a given uplink transmit power control message is received at the client device from a base station, determining whether the actual uplink transmit power level used for transmission $P_{TX\_A}$ is different from the $P_{TX\_C}$ between receipt of two successive uplink power control messages at the client device from the base station; and controlling, by the processing device, when the $P_{TX\_A}$ is determined to be different from the $P_{TX\_C}$ between the receipt of two successive uplink power control messages, adjusting the $P_{TX\_A}$ based on the two successive uplink power control messages.

In one alternative, the adjusting the $P_{TX\_A}$ based on the two successive uplink power control messages may be based on a time interval between a time of data transmission from the client device using the actual uplink transmit power level used for transmission $P_{TX\_A}$ and a time at which at least a first of the two successive uplink power control messages is received at the client device.

In one alternative, the adjusting the $P_{TX\_A}$ based on the two successive uplink power control messages may include summing the $P_{TX\_A}$ and a power adjustment indicated by the two successive uplink power control messages.

In one alternative, the adjusting the $P_{TX\_A}$ based on the two successive uplink power control messages may include selecting an absolute maximum of $\Delta_1$, $\Delta_2$ and a power adjustment indicated by the two successive uplink power control messages.

In one alternative, $\delta_1$ and $\delta_2$ may be equal to 0.25 dB and 0.1 dB, respectively, and $\alpha_1$ and $\alpha_2$ may be equal to 1.5 dB and −2.0 dB, respectively.

In one alternative, the method may include controlling, by the processing device, monitoring whether a response to a Random Access related signal transmitted from the client device is received at the client device; and when a determination is a response is not received at the client device for each of a predetermined number of Random Access related signals $N_{RA}$ transmitted from the client device, setting an accumulated increase $\Delta_3$ equal to a sum of $\Delta_3$ and a power $\delta_3$, when the accumulated increase $\Delta_3$ is greater than an increase threshold $\alpha_3$, setting $\Delta_3$ equal to $\alpha_3$, and determining the actual uplink transmit power level to be used for transmission $P_{TX\_A}$ based on increasing $P_{TX\_C}$ by $\Delta_3$.

In one alternative, the method may include controlling, by the processing device, when a determination is a downlink resource allocation with a first Modulation and Coding Scheme (MCS) is received at the client device, in which the first MCS is different from a second MCS currently in operation at the client device, setting $\Delta_1$, $\Delta_2$, $N_{ACK}$ and $N_{NACK}$ equal to zero and $P_{TX\_A}=P_{TX\_C}$.

In one alternative, the method may include controlling, by the processing device, when a determination is System Information (SI) changing a parameter of an uplink transmit power control loop is received at the client device, setting $\Delta_1$, $\Delta_2$, $N_{ACK}$ and $N_{NACK}$ equal to zero and $P_{TX\_A}=P_{TX\_C}$.

In accordance with an aspect of the disclosure, an apparatus may adjust uplink power at a client device in a wireless communication network. The apparatus may include circuitry configured to control: monitoring whether a positive acknowledgement (ACK) or negative acknowledgement (NACK) is received at the client device, (A) when a given NACK is determined to be received and a number of NACKs continuously received $N_{NACK}$ is determined to exceed a threshold $NACK_{TH}$, setting an accumulated increase $\Delta_1$ equal to a sum of $\Delta_1$ and a power $\delta_1$, $N_{NACK}$ equal to zero, and an accumulated decrease $\Delta_2$ equal to zero, and when the accumulated increase $\Delta_1$ is greater than an increase threshold $\alpha_1$, setting $\Delta_1$ equal to $\alpha_1$; (B) when a given ACK is determined to be received and a number of ACKs continuously received $N_{ACK}$ is determined to exceed a threshold $ACK_{TH}$, setting the accumulated decrease $\Delta_2$ equal to a power $\delta_2$ subtracted from $\Delta_2$, $N_{ACK}$ equal to zero, and the accumulated increase $\Delta_1$ equal to zero, and when the accumulated decrease $\Delta_2$ is less than a decrease threshold $\alpha_2$, setting $\Delta_2$ equal to $\alpha_2$; and (C) when the given ACK or the given NACK is determined to be received, determining an actual uplink transmit power level to be used for transmission $P_{TX\_A}$, wherein $P_{TX\_A}=P_{TX\_C}+\Delta_1+\Delta_2$ and wherein $P_{TX\_C}$ is equal to a current uplink transmit power level commanded by the network, wherein the actual uplink transmit power level to be used for transmission $P_{TX\_A}$ is determined independent of receipt of an uplink power control message from the network at the client device.

In one alternative of the apparatus, the circuitry may be configured to control, when a given uplink power control message is not received from the network at the client device before an initial transmission of new data by the client device, setting an uplink transmit power level to be used for the initial transmission of the new data to an uplink transmit power level corresponding to a last successful uplink transmission by the client device.

In one alternative of the apparatus, the circuitry may be configured to control, when a given uplink transmit power control message is received at the client device from a base station, determining whether the actual uplink transmit power level used for transmission $P_{TX\_A}$ is different from the $P_{TX\_C}$ between receipt of two successive uplink power control messages at the client device from the base station; and, when the $P_{TX\_A}$ is determined to be different from the $P_{TX\_C}$ between the receipt of two successive uplink power control messages, adjusting the $P_{TX\_A}$ based on the two successive uplink power control messages.

In one alternative of the apparatus, the circuitry may be configured to control: monitoring whether a response to a Random Access related signal transmitted from the client device is received at the client device; and when a determination is a response is not received at the client device for each of a predetermined number of Random Access related signals $N_{RA}$ transmitted from the client device, setting an accumulated increase $\Delta_3$ equal to a sum of $\Delta_3$ and a power $\delta_3$, when the accumulated increase $\Delta_3$ is greater than an increase threshold $\alpha_3$, setting $\Delta_3$ equal to $\alpha_3$, and determining the actual uplink transmit power level to be used for transmission $P_{TX\_A}$ based on increasing $P_{TX\_C}$ by $\Delta_3$.

In one alternative of the apparatus, the circuitry may be configured to control, when a determination is a downlink resource allocation with a first Modulation and Coding Scheme (MCS) is received at the client device, in which the first MCS is different from a second MCS currently in operation at the client device, setting $\Delta_1$, $\Delta_2$, $N_{ACK}$ and $N_{NACK}$ equal to zero and $P_{TX\_A} = P_{TX\_C}$.

In one alternative of the apparatus, the circuitry may be configured to control, when a determination is System Information (SI) changing a parameter of an uplink transmit power control loop is received at the client device, setting $\Delta_1$, $\Delta_2$, $N_{ACK}$ and $N_{NACK}$ equal to zero and $P_{TX\_A} = P_{TX\_C}$.

In accordance with an aspect of the disclosure, a wireless communication device may include a receiver to receive a signal from a wireless communication network; and a processing device configured to adjust uplink power at the wireless communication device. The processing device may be configured to control: monitoring whether a positive acknowledgement (ACK) or negative acknowledgement (NACK) is received, (A) when a given NACK is determined to be received and a number of NACKs continuously received $N_{NACK}$ is determined to exceed a threshold $NACK_{TH}$, setting an accumulated increase $\Delta_1$ equal to a sum of $\Delta_1$ and a power $\delta_1$, $N_{NACK}$ equal to zero, and an accumulated decrease $\Delta_2$ equal to zero, and when the accumulated increase $\Delta_1$ is greater than an increase threshold $\alpha_1$, setting $\Delta_1$ equal to $\alpha_1$; (B) when a given ACK is determined to be received and a number of ACKs continuously received $N_{ACK}$ is determined to exceed a threshold $ACK_{TH}$, setting the accumulated decrease $\Delta_2$ equal to a power $\delta_2$ subtracted from $\Delta_2$, $N_{ACK}$ equal to zero, and the accumulated increase $\Delta_1$ equal to zero, and when the accumulated decrease $\Delta_2$ is less than a decrease threshold $\alpha_2$, setting $\Delta_2$ equal to $\alpha_2$; and (C) when the given ACK or the given NACK is determined to be received, determining an actual uplink transmit power level to be used for transmission $P_{TX\_A}$, wherein $P_{TX\_A} = P_{TX\_C} + \Delta_1 + \Delta_2$ and wherein $P_{TX\_C}$ is equal to a current uplink transmit power level commanded by the network, wherein the actual uplink transmit power level to be used for transmission $P_{TX\_A}$ is determined independent of receipt of an uplink power control message from the network at the wireless communication device.

In one alternative of the wireless communication device, the processing device may be configured to control, when a given uplink power control message is not received from the network before an initial transmission of new data, setting an uplink transmit power level to be used for the initial transmission of the new data to an uplink transmit power level corresponding to a last successful uplink transmission.

DETAILED DESCRIPTION

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the aspects of the disclosure are not intended to be limited to the specific terms used.

The client terminal may receive feedback from the base station through multiple mechanisms. The uplink transmit power control message is one such mechanism. Other feedback mechanisms may include the acknowledgement message sent by the base station for the data transmitted in the uplink by the client terminal. The acknowledgement can be positive (ACK) or negative (NACK). If there is a negative acknowledgement, the client terminal may be required to retransmit the same data. In some cases, there is no explicit allocation of resources for retransmitting the same data. The client terminal may be expected to use the same uplink resources it used for the initial transmission. In this scenario the client terminal has received a feedback from the base station that the last transmission of the data was not successful but there is no uplink transmit power control message received from the base station.

According to an aspect of the present disclosure, whenever there is a negative acknowledgement for the data transmitted by the client terminal and the client terminal has to retransmit the same data on the uplink resources according to the initial transmission, the client terminal may increase its uplink transmit power by a configurable amount denoted as $\delta_1$ dB. If another retransmission of the same data is required, client terminal may increase its uplink transmit power by another $\delta_1$ dB. The change in uplink transmit power may be performed by the client terminal autonomously without explicitly receiving an uplink power control message from the network. This is referred herein as autonomous power control. According to another aspect of the present disclosure, the client terminal may keep track of the total amount of uplink transmit power increase by accumulating all the changes in uplink transmit power due to autonomous power control. The accumulated uplink transmit power increase due to autonomous power control is denoted by $\Delta_1$ dB. According to another aspect of the present disclosure the maximum accumulated uplink transmit power increase due to autonomous power control may be limited by a configurable amount denoted as $\alpha_1$. This method, on average, may reduce the number of retransmissions and therefore may reduce power consumption and latency.

According to another aspect of the present disclosure, the client terminal may monitor the number of ACK and NACK received in the downlink for each of the uplink transmissions made by the client terminal. If a certain configurable number of ACKs, namely $N_{ACK}$, are received continuously, the client terminal may decrease its power autonomously by a configurable amount $\delta_2$ such that the uplink transmit power is within the requirements of the wireless communication network and yet reduce the power consumption. The client terminal may keep track of the total amount of uplink transmit power decrease by accumulating all the changes in uplink transmit power through autonomous power control. The accumulated uplink transmit power decrease due to autonomous power control is denoted by $\Delta_2$ dB. The maximum accumulated autonomous uplink transmit power decrease may be limited by the parameter $\alpha_2$.

Figure 4:
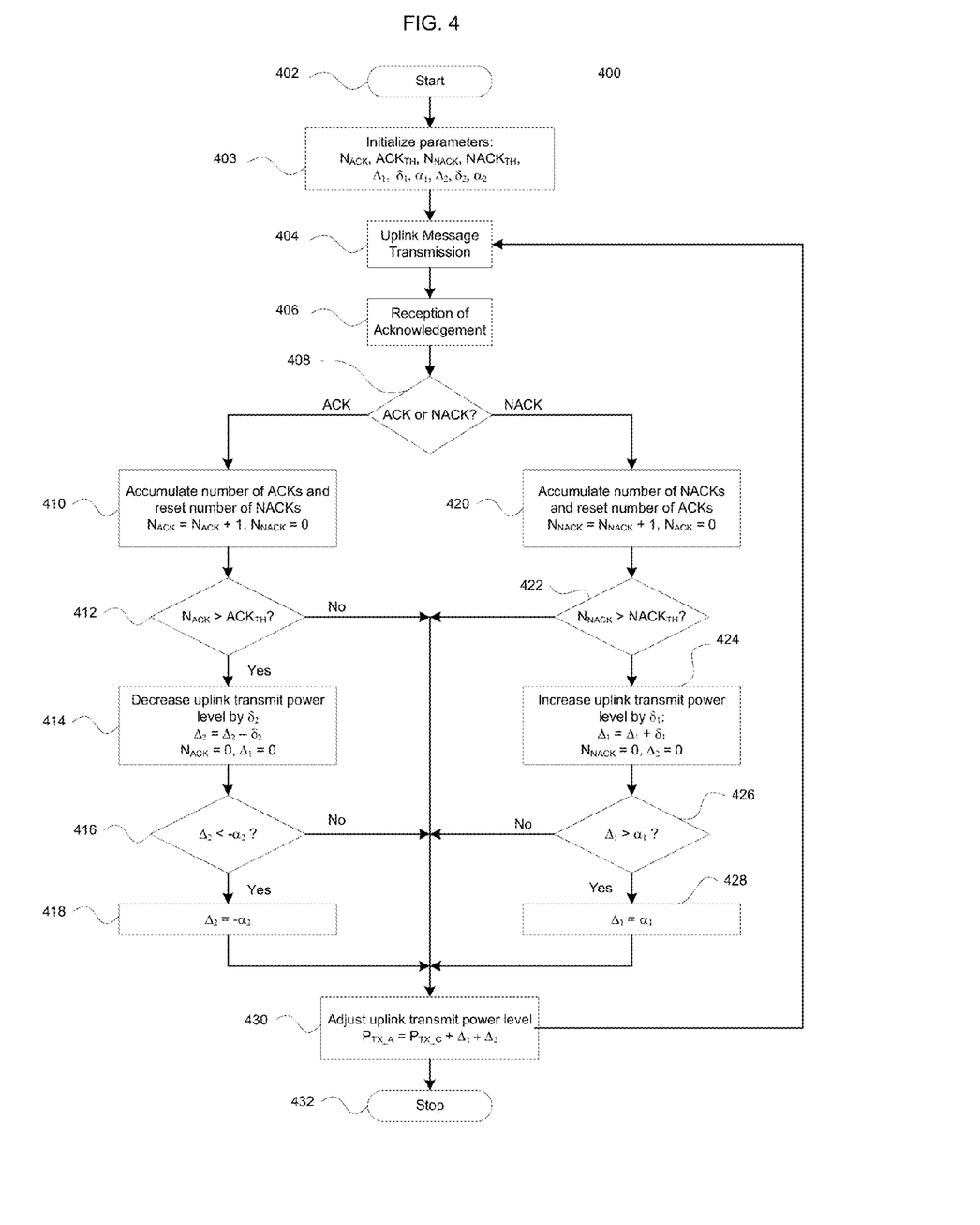
FIG. 4 illustrates processing steps for uplink transmit power adjustment according to the aspects of the present disclosure.

The flow diagram 400 contained in FIG. 4 illustrates an exemplary scenario based power adjustment method according to the aspects of the present disclosure. The processing relevant to the present disclosure begins at processing stage 403 where the parameters $N_{ACK}$, $N_{NACK}$, $\Delta_1$, and $\Delta_2$ are initialized to zero and the parameters $ACK_{TH}$, $NACK_{TH}$, $\delta_1$, $\alpha_1$, $\delta_2$, and $\alpha_2$ are initialized to their default configurable values. Next at processing stage 404, an uplink message may be transmitted by a client terminal. At processing stage 406, the client terminal may receive the acknowledgement from the base station regarding the last transmission from the client terminal. At processing stage 408, a determination is made as to whether a positive acknowledgement (ACK) or negative acknowledgement (NACK) is received. If an ACK is received, the processing continues at stage 410. At processing stage 410, the number of positive acknowledgements $N_{ACK}$ is incremented by one and the number of negative acknowledgements $N_{NACK}$ is reset to zero. At processing stage 412, $N_{ACK}$ is compared against the threshold $ACK_{TH}$. If $N_{ACK}$ is greater than $ACK_{TH}$, the processing continues at stage 414. At processing stage 414, it is decided to decrease the uplink transmit power level by $\delta_2$ dB. The accumulated decrease $\Delta_2$ is updated as $\Delta_2 = \Delta_2 - \delta_2$. The accumulated number of ACKs, i.e., $N_{ACK}$, and $\Delta_1$ are reset to zero. Next at processing stage 416, a determination is made whether the accumulated decrease $\Delta_2$ in uplink transmit power is less than the configurable limit $\alpha_2$. If the accumulated decrease $\Delta_2$ is less than $\alpha_2$, the processing continues at processing stage 418, where the decrease is limited to $\alpha_2$ dB. Next the processing continues to the stage 430. Returning to the processing stage 416, if the accumulated decrease $\Delta_2$ is not less than $\alpha_2$, the processing directly continues at processing stage 430. Returning to the processing stage 412, if $N_{ACK}$ is not greater than $ACK_{TH}$, the processing continues at stage 430. Returning to the processing stage 408, if a NACK is received, the processing continues at stage 420. At processing stage 420, the number of negative acknowledgements $N_{NACK}$ is incremented by one and the number of positive acknowledgements $N_{ACK}$ is reset to zero. At processing stage 422, $N_{NACK}$ is compared against the threshold $NACK_{TH}$. If $N_{NACK}$ is greater than $NACK_{TH}$, the processing continues at stage 424. At processing stage 424, it is decided to increase the uplink transmit power level by $\delta_1$ dB. The total accumulated increase $\Delta_1$ is updated as $\Delta_1 = \Delta_1 + \delta_1$. The accumulated number of NACKs, i.e., $N_{NACK}$ and $\Delta_2$ are reset to zero. Next at processing continues 426, a determination is made whether the accumulated increase $\Delta_1$ in uplink transmit power is greater than the configurable limit $\alpha_1$. If the accumulated increase $\Delta_1$ is greater than $\alpha_1$, the processing continues at processing stage 428 where the accumulated increase $\Delta_1$ is limited to $\alpha_1$ dB. Next the processing continues to the stage 430. Returning to the processing stage 426, if the accumulated increase $\Delta_1$ is not greater than $\alpha_1$, the processing directly continues at processing stage 430. Returning to the processing stage 422, if $N_{NACK}$ is not greater than $NACK_{TH}$, the processing continues at stage 430. At processing stage 430, the accumulated increase or decrease is then applied to the current uplink transmit power level commanded by the network, $P_{TX\_C}$, to obtain the actual uplink transmit power, $P_{TX\_A}$, to be used for transmission, i.e., $P_{TX\_A} = P_{TX\_C} + \Delta_1 + \Delta_2$. Note that at any given processing cycle, at least either $\Delta_1$ or $\Delta_2$ is zero. Furthermore, $\Delta_1$ is always greater than or equal to zero and $\Delta_2$ is always less than or equal to zero. If there is further uplink transmission to be done, the processing continues at processing stage 404. If there is no further uplink transmission to be performed, the processing suitably terminates at processing stage 432.

According to another aspect of the present disclosure, the uplink transmit power level for the initial transmission of a new data may use the uplink transmit power level corresponding to a last successful uplink transmission, if there is no uplink power control message received before the initial transmission of a new data.

According to another aspect of the present disclosure, when the client terminal receives any uplink transmit power control messages from the base station, the client terminal checks whether it made any autonomous adjustments between two successive uplink power control messages from the base station. According to another aspect of the present disclosure, if the client terminal made any adjustment to the uplink transmit power level commanded by the network, $P_{TX\_C}$, the autonomous adjustment to the power level may be applied to the newly commanded transmit power level commanded by the network. The adjustment made to the actual uplink transmit power level is based on the combination of the uplink transmit power control messages received from the base station and any autonomous power control adjustment made by the client terminal. Furthermore, the particular combination of the uplink transmit power control messages received from the base station and any autonomous power control adjustment made by the client terminal may be a function of the time gap between the instant at which the autonomous uplink power control is applied and the instant at which the uplink transmit power control message from the network is received. The combination may include the sum of the two power control adjustments or the selection of the absolute maximum of the two power control adjustments.

A wireless communication network may require a client terminal to transmit the uplink signal with the uplink transmit power level within the specified limits. For example, the uplink transmit power level may be allowed tolerance of $\alpha_1 = 2$ dB above the expected specified power level and $\alpha_2 = 3$ dB below the expected specified power level. This accuracy requirement is generally specified as relative accuracy with respect to the nominal power level. Therefore, the amount of autonomous power control adjustment performed by the client terminal may be limited to be within these specified limits according to the aspects of the present disclosure. For example, the parameters $\delta_1$ and $\delta_2$ may be configured to be 0.25 dB and 0.1 dB respectively whereas the parameter $\alpha_1$ and $\alpha_2$ may be configured to be 1.5 dB and −2.0 dB respectively.

Another type of feedback from the base station is the non reception of any feedback from the base station. For example, when the client terminal transmits a Random Access related signal and if there is no response to this transmission from the base station, this non response can be used by the client terminal as a feedback from the base station. The lack of response from the base station may be an indication that the base station was unable to successfully receive the Random Access related signal from the client terminal According to an aspect of the present disclosure, the client terminal may increase its uplink transmit power by $\delta_3$ if there is no response from the base station for configurable number of Random Access related signals transmitted by client terminal. The configurable number of Random Access signal transmissions without any response from the network after which the client terminal may perform autonomous power adjustment is denoted by $N_{RA}$. According to another aspect of the present disclosure, the client terminal keeps track of the total amount of uplink transmit power adjustments for Random Access signal by accumulating all the changes in uplink transmit power for Random Access due to autonomous power control. The accumulated uplink transmit power adjustment for Random Access signal due to autonomous power control is denoted by $\Delta_{RA}$. According to another aspect of the present disclosure the maximum accumulated uplink transmit power due to autonomous power control is limited by a configurable amount denoted as $\alpha_{RA}$. The values for configurable parameters $\delta_3$ may be different from the other autonomous transmit power level adjustments based on ACK/NACK. This is because the power control adjustments in uplink transmit power are based on non-response from the base station rather than ACK/NACK response from the base station.

According to another aspect of the present disclosure, if the client terminal receives a downlink resource allocation with a different Modulation and Coding Scheme (MCS), it may reset to zero the accumulated autonomous uplink transmit power adjustments $\Delta_1$ and $\Delta_2$. It may also reset to zero the counters $N_{ACK}$ and $N_{NACK}$. The client terminal may set the actual uplink transmit power, $P_{TX\_A}$, equal to the uplink transmit power level commanded by the network, $P_{TX\_C}$, i.e., $P_{TX\_A}=P_{TX\_C}$.

According to another aspect of the present disclosure, if there is a change in the cell System Information (SI) that change the parameters of the uplink transmit power control loop, the client terminal may reset to zero the accumulated autonomous uplink transmit power adjustments $\Delta_1$ and $\Delta_2$. It may also reset to zero the counters $N_{ACK}$ and $N_{NACK}$. The client terminal may set the actual uplink transmit power, $P_{TX\_A}$, equal to the uplink transmit power level commanded by the network, $P_{TX\_C}$, i.e., $P_{TX\_A}=P_{TX\_C}$.

The power adjustments to the uplink transmit power level commanded by the network as per the aspects of the present disclosure may be subject to the absolute maximum and minimum power limits specified by the wireless communication system.

The method and apparatus for autonomous uplink transmit power control described in the present disclosure enables reduced transmit power on average, reduces latency due to reduced retransmissions and overall improves the user experience. The method described herein is applicable to wireless communication systems such as 3$^{rd}$ Generation Partnership Project (3GPP) Long Term Evolution (LTE), 3GPP Wideband Code Division Multiple Access (WCDMA), IEEE 802.16, IEEE 802.11, and any other wireless communication system involving uplink power control.

By way of example only, the above described method may be implemented in a receiver, e.g., a user device such as a wireless mobile station (MS) 12 as shown in FIG. 1.

Figure 5:
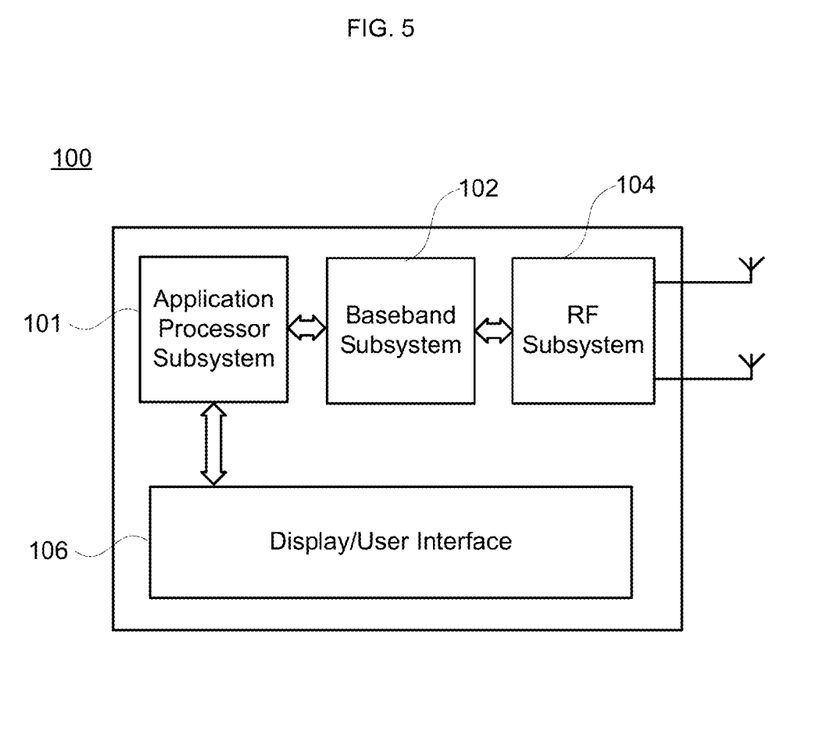
FIG. 5 illustrates a wireless mobile station diagram, which may be employed with aspects of the disclosure described herein.

As shown in FIG. 5, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 6:
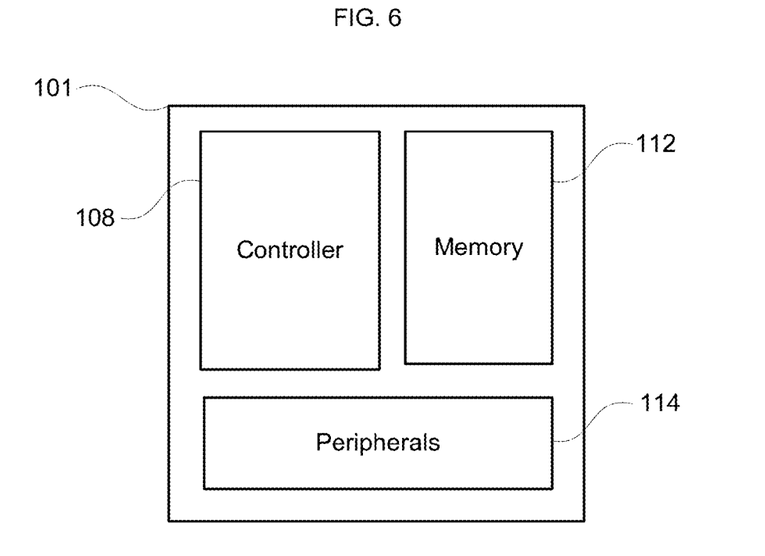
FIG. 6 illustrates an application processor subsystem for a wireless mobile station, which may be employed with aspects of the disclosure described herein.
Figure 7:
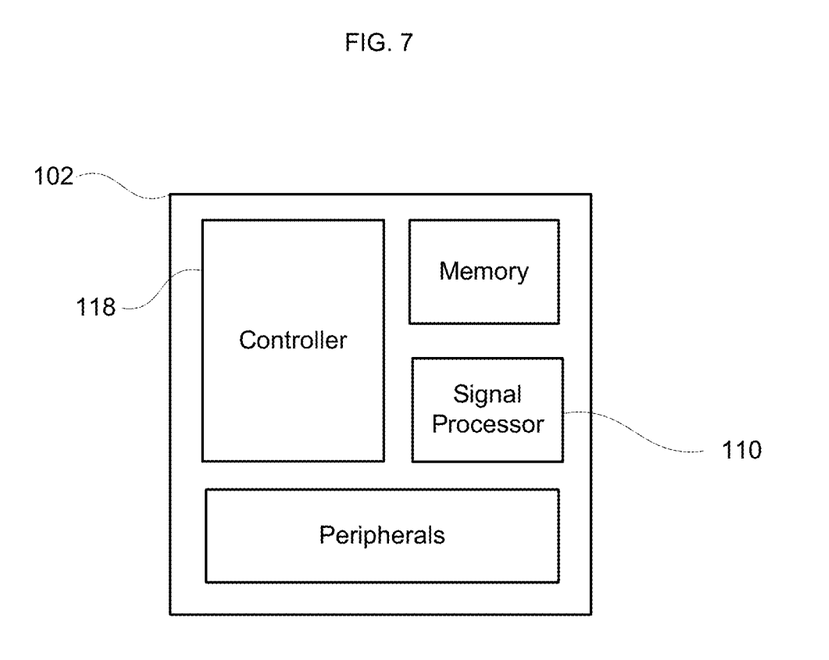
FIG. 7 illustrates a baseband subsystem for a wireless mobile station, which may be employed with aspects of the disclosure described herein.
Figure 8:
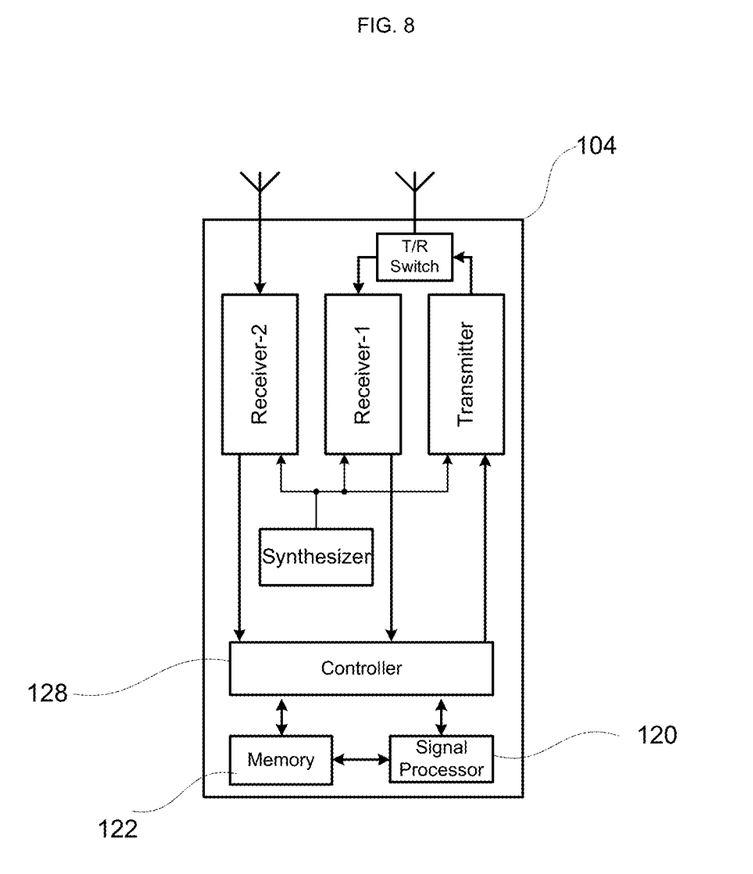
FIG. 8 illustrates a Radio Frequency (RF) subsystem for a wireless mobile station, which may be employed with aspects of the disclosure described herein.

The application processor subsystem 101 as shown in FIG. 6 may include a controller 108 such as a microcontroller, another processor or other circuitry. The baseband subsystem 102 as shown in FIG. 7 may include a controller 118 such as a microcontroller or other processor. The RF subsystem 104 as shown in FIG. 8 may include a controller 128 such as a microcontroller, another processor or other circuitry. The controller 108 desirably handles overall operation of the MS 100. This may be done by any combination of hardware, software and firmware running on the controller 108. Such combination of hardware, software and firmware may embody any methods in accordance with the aspects of the present disclosure.

In FIG. 7 the peripherals 114 such as a full or partial keyboard, video or still image display, audio interface, etc., may be employed and managed through the controller 108.

Aspects of the present disclosure may be implemented in firmware of the controller 108 of the application processor and/or the controller 118 of the baseband subsystem as shown in FIG. 7. In another alternative, aspects of the present disclosure may also be implemented as a combination of firmware and hardware of the application processor subsystem 101 and/or the baseband subsystem 102. For instance, signal processing functionality of any or all of the FIG. 7 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for adjusting uplink power at a client device in a wireless communication network, the method comprising:
controlling, by a processing device,
monitoring whether a negative acknowledgement (NACK) is received at the client device; and
when a NACK is determined to be received,
setting an accumulated increase $\Delta_1$ equal to a sum of $\Delta_1$ and a power $\delta_1$,
when the accumulated increase $\Delta_1$ is greater than an increase threshold $\alpha_1$, setting $\Delta_1$ equal to $\alpha_1$, and
determining an uplink transmit power level to be used for transmission $P_{TX\_A}$, wherein $P_{TX\_A}=P_{TX\_C}+\Delta_1$ and wherein $P_{TX\_C}$ is equal to a current uplink transmit power level commanded by the network,
wherein the uplink transmit power level to be used for transmission $P_{TX\_A}$ is determined independent of receipt of an uplink power control message from the network at the client device.

2. A method for adjusting uplink power at client device in a wireless communication network, the method comprising:
controlling, by a processing device,
monitoring a number of positive acknowledgements (ACK) continuously received at the client device; and
when the number of ACKs continuously received is determined to exceed a threshold $ACK_{TH}$,
setting an accumulated decrease $\Delta_1$ equal to a power $\delta_1$ subtracted from $\Delta_1$,
when the accumulated decrease $\Delta_1$ is less than a decrease threshold $\alpha_1$, setting $\Delta_1$ equal to $\alpha_1$, and
determining an uplink transmit power level to be used for transmission $P_{TX\_A}$, wherein $P_{TX\_A}=P_{TX\_C}+\Delta_1$ and wherein $P_{TX\_C}$ is equal to a current uplink transmit power level commanded by the network,
wherein the uplink transmit power level to be used for transmission $P_{TX\_A}$ is determined independent of receipt of an uplink power control message from the network at the client device.

3. A method for adjusting uplink power at a client device in a wireless communication network, the method comprising:
controlling, by a processing device,
monitoring whether a positive acknowledgement (ACK) or negative acknowledgement (NACK) is received at the client device,
(A) when a given NACK is determined to be received and a number of NACKs continuously received $N_{NACK}$ is determined to exceed a threshold $NACK_{TH}$,
setting an accumulated increase $\Delta_1$ equal to a sum of $\Delta_1$ and a power $\delta_1$, $N_{NACK}$ equal to zero, and an accumulated decrease $\Delta_2$ equal to zero, and
when the accumulated increase $\Delta_1$ is greater than an increase threshold $\alpha_1$, setting $\Delta_1$ equal to $\alpha_1$;
(B) when a given ACK is determined to be received and a number of ACKs continuously received $N_{ACK}$ is determined to exceed a threshold $ACK_{TH}$,
setting the accumulated decrease $\Delta_2$ equal to a power $\delta_2$ subtracted from $\Delta_2$, $N_{ACK}$ equal to zero, and the accumulated increase $\Delta_1$ equal to zero, and
when the accumulated decrease $\Delta_2$ is less than a decrease threshold $\alpha_2$, setting $\Delta_2$ equal to $\alpha_2$; and
(C) when the given ACK or the given NACK is determined to be received, determining an actual uplink transmit power level to be used for transmission $P_{TX\_A}$, wherein $P_{TX\_A}=P_{TX\_C}+\Delta_1+\Delta_2$ and wherein $P_{TX\_C}$ is equal to a current uplink transmit power level commanded by the network,
wherein the actual uplink transmit power level to be used for transmission $P_{TX\_A}$ is determined independent of receipt of an uplink power control message from the network at the client device.

4. The method of claim 3, further comprising:
controlling, by the processing device, when a given uplink power control message is not received from the network at the client device before an initial transmission of new data by the client device, setting an uplink transmit power level to be used for the initial transmission of the new data to an uplink transmit power level corresponding to a last successful uplink transmission by the client device.

5. The method of claim 3, further comprising:
controlling, by the processing device, when a given uplink transmit power control message is received at the client device from a base station, determining whether the actual uplink transmit power level used for transmission $P_{TX\_A}$ is different from the $P_{TX\_C}$ between receipt of two successive uplink power control messages at the client device from the base station; and
controlling, by the processing device, when the $P_{TX\_A}$ is determined to be different from the $P_{TX\_C}$ between the receipt of two successive uplink power control messages, adjusting the $P_{TX\_A}$ based on the two successive uplink power control messages.

6. The method of claim 5, wherein the adjusting the $P_{TX\_A}$ based on the two successive uplink power control messages is based on a time interval between a time of data transmission from the client device using the actual uplink transmit power level used for transmission $P_{TX\_A}$ and a time at which at least a first of the two successive uplink power control messages is received at the client device.

7. The method of claim 5, wherein the adjusting the $P_{TX\_A}$ based on the two successive uplink power control messages includes summing the $P_{TX\_A}$ and a power adjustment indicated by the two successive uplink power control messages.

8. The method of claim 5, wherein the adjusting the $P_{TX\_A}$ based on the two successive uplink power control messages includes selecting an absolute maximum of $\Delta_1$, $\Delta_2$ and a power adjustment indicated by the two successive uplink power control messages.

9. The method of claim 3, wherein $\delta_1$ and $\delta_2$ are equal to 0.25 dB and 0.1 dB, respectively, and $\alpha_1$ and $\alpha_2$ are equal to 1.5 dB and −2.0 dB, respectively.

10. The method of claim 3, further comprising:
controlling, by the processing device,
monitoring whether a response to a Random Access related signal transmitted from the client device is received at the client device; and
when a determination is a response is not received at the client device for each of a predetermined number of Random Access related signals $N_{RA}$ transmitted from the client device,
setting an accumulated increase $\Delta_3$ equal to a sum of $\Delta_3$ and a power $\delta_3$,
when the accumulated increase $\Delta_3$ is greater than an increase threshold $\alpha_3$, setting $\Delta_3$ equal to $\alpha_3$, and
determining the actual uplink transmit power level to be used for transmission $P_{TX\_A}$ based on increasing $P_{TX\_C}$ by $\Delta_3$.

11. The method of claim 3, further comprising:
controlling, by the processing device, when a determination is a downlink resource allocation with a first Modulation and Coding Scheme (MCS) is received at the client device, in which the first MCS is different from a second MCS currently in operation at the client device, setting $\Delta_1$, $\Delta_2$, $N_{ACK}$ and $N_{NACK}$ equal to zero and $P_{TX\_A} = P_{TX\_C}$.

12. The method of claim 3, further comprising:
controlling, by the processing device, when a determination is System Information (SI) changing a parameter of an uplink transmit power control loop is received at the client device, setting $\Delta_1$, $\Delta_2$, $N_{ACK}$ and $N_{NACK}$ equal to zero and $P_{TX\_A} = P_{TX\_C}$.

13. An apparatus for adjusting uplink power at a client device in a wireless communication network, the apparatus comprising:
circuitry configured to control:
monitoring whether a positive acknowledgement (ACK) or negative acknowledgement (NACK) is received at the client device,
(A) when a given NACK is determined to be received and a number of NACKs continuously received $N_{NACK}$ is determined to exceed a threshold $NACK_{TH}$,
setting an accumulated increase $\Delta_1$ equal to a sum of $\Delta_1$ and a power $\delta_1$, $N_{NACK}$ equal to zero, and an accumulated decrease $\Delta_2$ equal to zero, and
when the accumulated increase $\Delta_1$ is greater than an increase threshold $\alpha_1$, setting $\Delta_1$ equal to $\alpha_1$;
(B) when a given ACK is determined to be received and a number of ACKs continuously received $N_{ACK}$ is determined to exceed a threshold $ACK_{TH}$,
setting the accumulated decrease $\Delta_2$ equal to a power $\delta_2$ subtracted from $\Delta_2$, $N_{ACK}$ equal to zero, and the accumulated increase $\Delta_1$ equal to zero, and
when the accumulated decrease $\Delta_2$ is less than a decrease threshold $\alpha_2$, setting $\Delta_2$ equal to $\alpha_2$; and
(C) when the given ACK or the given NACK is determined to be received, determining an actual uplink transmit power level to be used for transmission $P_{TX\_A}$, wherein $P_{TX\_A} = P_{TX\_C} + \Delta_1 + \Delta_2$ and wherein $P_{TX\_C}$ is equal to a current uplink transmit power level commanded by the network,
wherein the actual uplink transmit power level to be used for transmission $P_{TX\_A}$ is determined independent of receipt of an uplink power control message from the network at the client device.

14. The apparatus of claim 13,
wherein the circuitry is configured to control, when a given uplink power control message is not received from the network at the client device before an initial transmission of new data by the client device, setting an uplink transmit power level to be used for the initial transmission of the new data to an uplink transmit power level corresponding to a last successful uplink transmission by the client device.

15. The apparatus of claim 13,
wherein the circuitry is configured to control:
when a given uplink transmit power control message is received at the client device from a base station, determining whether the actual uplink transmit power level used for transmission $P_{TX\_A}$ is different from the $P_{TX\_C}$ between receipt of two successive uplink power control messages at the client device from the base station; and when the $P_{TX\_A}$ is determined to be different from the $P_{TX\_C}$ between the receipt of two successive uplink power control messages, adjusting the $P_{TX\_A}$ based on the two successive uplink power control messages.

16. The apparatus of claim 13,
wherein the circuitry is configured to control:
monitoring whether a response to a Random Access related signal transmitted from the client device is received at the client device; and
when a determination is a response is not received at the client device for each of a predetermined number of Random Access related signals $N_{RA}$ transmitted from the client device,
setting an accumulated increase $\Delta_3$ equal to a sum of $\Delta_3$ and a power $\delta_3$,
when the accumulated increase $\Delta_3$ is greater than an increase threshold $\alpha_3$, setting $\Delta_3$ equal to $\alpha_3$, and
determining the actual uplink transmit power level to be used for transmission $P_{TX\_A}$ based on increasing $P_{TX\_C}$ by $\Delta_3$.

17. The apparatus of claim 13,
wherein the circuitry is configured to control, when a determination is a downlink resource allocation with a first Modulation and Coding Scheme (MCS) is received at the client device, in which the first MCS is different from a second MCS currently in operation at the client device, setting $\Delta_1$, $\Delta_2$, $N_{ACK}$ and $N_{NACK}$ equal to zero and $P_{TX\_A} = P_{TX\_C}$.

18. The apparatus of claim 13,
wherein the circuitry is configured to control, when a determination is System Information (SI) changing a parameter of an uplink transmit power control loop is received at the client device, setting $\Delta_1$, $\Delta_2$, $N_{ACK}$ and $N_{NACK}$ equal to zero and $P_{TX\_A} = P_{TX\_C}$.

19. A wireless communication device comprising:
a receiver to receive a signal from a wireless communication network; and
a processing device configured to adjust uplink power at the wireless communication device,
wherein the processing device is configured to control:
monitoring whether a positive acknowledgement (ACK) or negative acknowledgement (NACK) is received,
(A) when a given NACK is determined to be received and a number of NACKs continuously received $N_{NACK}$ is determined to exceed a threshold $NACK_{TH}$,
setting an accumulated increase $\Delta_1$ equal to a sum of $\Delta_1$ and a power $\delta_1$, $N_{NACK}$ equal to zero, and an accumulated decrease $\Delta_2$ equal to zero, and
when the accumulated increase $\Delta_1$ is greater than an increase threshold $\alpha_1$, setting $\Delta_1$ equal to $\alpha_1$;
(B) when a given ACK is determined to be received and a number of ACKs continuously received $N_{ACK}$ is determined to exceed a threshold $ACK_{TH}$,
setting the accumulated decrease $\Delta_2$ equal to a power $\delta_2$ subtracted from $\Delta_2$, $N_{ACK}$ equal to zero, and the accumulated increase $\Delta_1$ equal to zero, and
when the accumulated decrease $\Delta_2$ is less than a decrease threshold $\alpha_2$, setting $\Delta_2$ equal to $\alpha_2$; and
(C) when the given ACK or the given NACK is determined to be received, determining an actual uplink transmit power level to be used for transmission $P_{TX\_A}$, wherein $P_{TX\_A} = P_{TX\_C} + \Delta_1 + \Delta_2$ and wherein $P_{TX\_C}$ is equal to a current uplink transmit power level commanded by the network, wherein the actual uplink transmit power level to be used for transmission $P_{TX\_A}$ is determined independent of receipt of an uplink power control message from the network at the wireless communication device.

20. The wireless communication device of claim 19, wherein the processing device is configured to control, when a given uplink power control message is not received from the network before an initial transmission of new data, setting an uplink transmit power level to be used for the initial transmission of the new data to an uplink transmit power level corresponding to a last successful uplink transmission.

* * * * *